(12) United States Patent
Rego et al.

(10) Patent No.: US 10,197,980 B2
(45) Date of Patent: Feb. 5, 2019

(54) POWER WINDOW CONTROL APPARATUS AND SYSTEM

(71) Applicant: FORD GLOBAL TECHNOLOGIES, LLC, Dearborn, MI (US)

(72) Inventors: Rafael Rego, Bloomfield Township, MI (US); Russell Allan Sims, Grosse Ile, MI (US); Glen D. Skinner, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 525 days.

(21) Appl. No.: 14/572,077

(22) Filed: Dec. 16, 2014

(65) Prior Publication Data
US 2016/0167605 A1 Jun. 16, 2016

(51) Int. Cl.
B60R 16/03 (2006.01)
G05B 15/02 (2006.01)
E05F 15/695 (2015.01)

(52) U.S. Cl.
CPC ............ *G05B 15/02* (2013.01); *E05F 15/695* (2015.01); *E05Y 2400/85* (2013.01)

(58) Field of Classification Search
CPC ............... H01H 1/5805; H01H 3/0213; H01H 13/7057; H01H 13/84; H01H 15/005; H01H 15/10; H01H 2239/078; H01H 2239/05; H01H 2300/01; H01H 2300/012; H01H 2025/048; E05Y 2400/35; E05Y 2400/85; E05Y 2400/86; E05Y 2400/854; E05Y 2900/542; E05Y 2900/55; E05F 15/00; E05F 15/41; E05F 15/689; E05F 15/695; G05B 15/02; B60R 16/03
See application file for complete search history.

(56) References Cited

U.S. PATENT DOCUMENTS

| 4,353,055 A * | 10/1982 | Kawakatsu | B60Q 9/001 340/457 |
| 6,657,316 B1 * | 12/2003 | Smith | B60J 7/0573 307/10.1 |
| 6,833,517 B2 | 12/2004 | Salome et al. | |
| 6,903,288 B2 | 6/2005 | Varga | |
| 2004/0154904 A1 * | 8/2004 | Varga | H01H 25/04 200/5 A |
| 2007/0095633 A1 * | 5/2007 | Sakai | H01H 13/7057 200/1 R |

(Continued)

FOREIGN PATENT DOCUMENTS

| DE | 19757231 A1 | 7/1999 |
| JP | 2003237503 A * | 8/2003 |
| JP | 2004169529 A | 6/2004 |

Primary Examiner — Thomas G Black
Assistant Examiner — Ce Li Li
(74) Attorney, Agent, or Firm — Frank MacKenzie; Brooks Kushman, P.C.

(57) ABSTRACT

A vehicle window system may include a switching mechanism having a plurality of window selector buttons each corresponding to one of a plurality of windows, and a single drive button for receiving input to move one or more of the windows according to statuses of the selector buttons. The window system may also include a controller configured to lock one of the windows in response to an indication that the window selector button corresponding to the one of the windows has been depressed for at least a predefined amount of time.

9 Claims, 3 Drawing Sheets

(56) References Cited

U.S. PATENT DOCUMENTS

2010/0039248 A1* 2/2010 Mauro .................. B60Q 11/00
340/438
2016/0121699 A1* 5/2016 Snider .................. E05F 15/643
49/13

* cited by examiner

POWER WINDOW CONTROL APPARATUS AND SYSTEM

TECHNICAL FIELD

This disclosure relates to power window control for a vehicle.

BACKGROUND

Vehicles often include multiple power windows. For example, sedans typically include a set of four power windows. Often times, a driver of a vehicle wishes to control each of the windows, but known control switches are often cumbersome to use, and require multiple user inputs in order to control each window.

SUMMARY

A vehicle window control system may include a switching mechanism having a plurality of window selector buttons each corresponding to one of a plurality of windows and a single drive button for receiving input to move one or more of the windows according to statuses of the selector buttons, and a controller configured to lock one of the windows in response to an indication that the window selector button corresponding to the one of the windows has been depressed for at least a predefined amount of time.

A vehicle may include a plurality of windows, a switch, and a controller configured to, in response to actuation of the switch exceeding a predefined amount of time, open each of the windows a predefined distance.

A vehicle may include a switching mechanism and a controller. The switching mechanism may have a plurality of window selector buttons each corresponding to one of a plurality of windows and including an indicator, and a single drive button for receiving input to move one or more of the windows according to statuses of the selector buttons. The controller may selectively illuminate the indicators based on position data of the windows.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a window control system and apparatus that allows a driver to control multiple windows within a vehicle with a single, non-rotary switch. Various user-interactions at the switch may facilitate various window controls such as simultaneously opening all of the vehicle windows upon the pressing of a button. Further, by "selecting" and "de-selecting" certain windows, a customized control panel may be realized which may provide for a user-friendly window control system that is both easy to operate and efficient to manipulate. Additionally, the system may warn the driver of open windows under certain conditions to prevent theft or weather damage.

Figure 1:
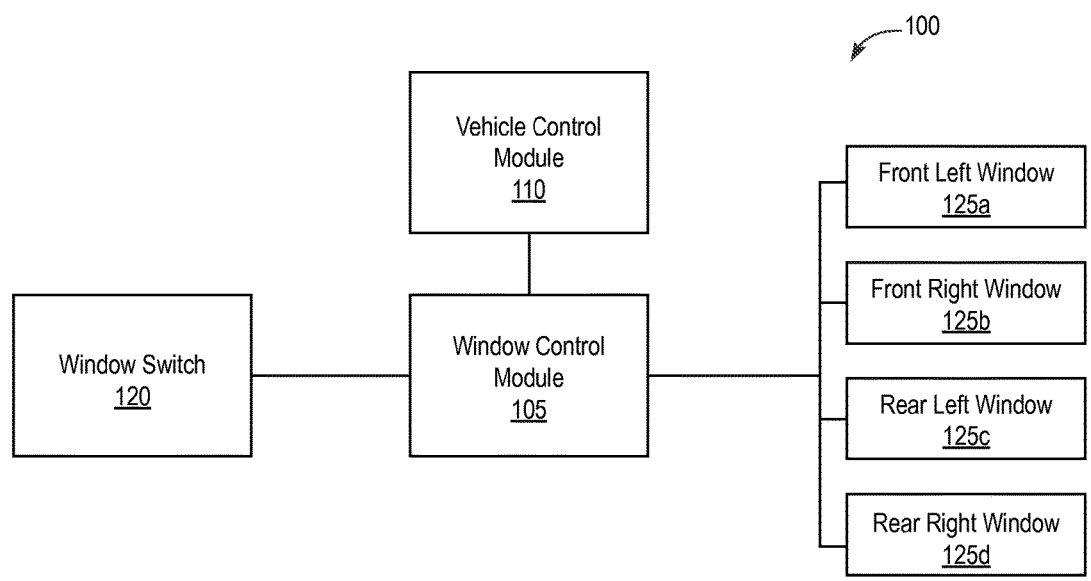
FIG. 1 illustrates a window control system.

FIG. 1 illustrates a vehicle window control system 100 including a window control module 105, a vehicle control module 110, and a window switch 120. The window control system 100 may include a plurality of vehicle windows 125 including a front left window 125a (also referred to as driver window 125a), a front right window 125b, a rear left window 125c, and a rear right window 125d. The windows 125 may be movable from a fully open position to a fully closed position, and any interim there between. Although four windows 125 are illustrated in FIG. 1 and references are made thereto herein, these windows are exemplary, different window types, as well as quantity thereof, may be included in the system 100 such as moon roof windows, sun roof windows, rear hatch door windows, etc.

The window control module 105 may include a processor having a controller and memory configured to receive and transmit commands and information between the window switch 120, the vehicle control module 110 and the windows 125. While a single window control module 105 is illustrated and discussed herein, multiple window control modules 105 may be included in the system. For example, a separate window control module 105 may be included for each of the front windows 125a, 125b, and the rear windows 125c, 125d. The window control module 105 may transmit commands to the windows 125 including instructions relating to a drive direction to open or close one or more windows 125. The commands may be transmitted to a motor within the window 125 that drives the window 125 up and down. Other components may also be included in the window 125 to facilitate movement of the window 125.

The vehicle control module 110 may include a processor having a controller and memory configured to receive and transmit commands and information between various vehicle modules (not shown) and the window control module 105. The vehicle control module 110 may facilitate providing the window control module 105 with vehicle status information such as the current state of the vehicle, including the clutch position (park, drive, reverse, neutral, etc.) of the vehicle. The vehicle control module 110 may also provide the window control module 105 with window status information such as the position that the window 125 is in, either open or closed, as well as intermediate positions there between, such as partially opened.

Figure 2:
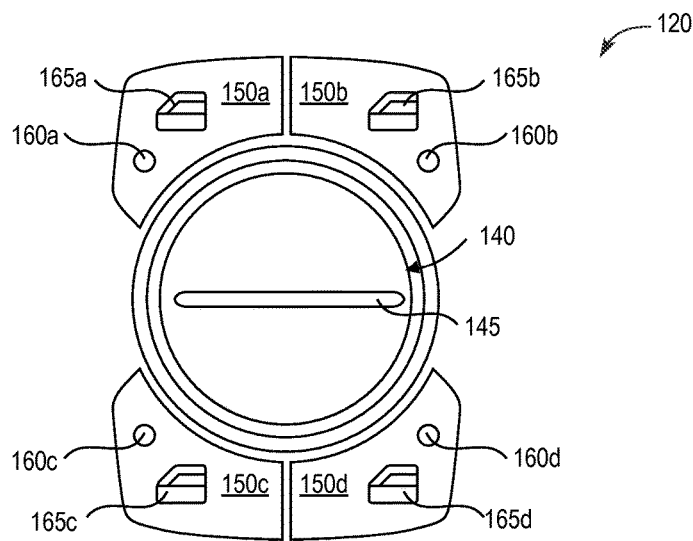
FIG. 2 illustrates a window switch for the window control system.

Referring now to FIG. 2, the window switch 120 is described in more detail. The window switch 120 may include a drive button 140. The drive button 140 may be a push-pull rocker-type of button capable of being pushed upward (towards the front of the vehicle), pushed downward (towards the back of the vehicle) and may be reverted to a normal position upon a lack of force thereon. The actuation at the drive button 140 may mimic that of the drive function of the windows 125. For example, the window 125 may be opened by pushing the drive button 140 downwards, and the window 125 may be closed by pushing the drive button 140 upwards. The drive button 140 may include a guide 145 such as a longitudinal protrusion for assisting the user in pushing and pulling the drive button 140. The guide 145 may be pushed upwards by the user, or downwards, to drive a window 125 up or down, respectively. The position of the guide 145 may also relate the state of the drive button 140 (e.g., upwards position, downwards position and normal position). The drive button 140 may control the various vehicle windows 125, as described herein.

The window switch 120 may also include a plurality of selector buttons 150. The selector buttons 150 may each correspond to one of the vehicle windows 125. The position of each selector button 150 may correspond to the location of the window 125 relative to the front of the vehicle. For example, a first selector button 150a may correspond to the front left window 125a. A second selector button 150b may correspond to the front left window (e.g., driver window 125a). The third selector button 150c and fourth selector button 150d may correspond to the rear left window 135c and the rear right window 125d, respectively. Each of the selector buttons 150 may include a status indicator 160 (as shown in FIG. 2 as status indicators 160a-d.) The status indicators 160 may be light emitting diodes (LEDs) configured to illuminate in response to the respective selector button 150 being selected. The status indicators 160 may convey to the user, which windows have been selected for control by the drive button 140.

The status indicators 160, in addition to indicating which of the windows 125 have been selected, may also have a secondary indication. The secondary indication may include indications relevant to the status of a specific window 125. In one example, a solid red light may indicate that the window 125 is locked. That is, the window 125 may not be operated by anyone other than the user/driver. In another example, a blinking red light may indicate that the window 125 is not completely closed when the vehicle is in park or neutral.

In addition to these status indicators 160, each selector button 150 may also include a window indicator 165 (as shown in FIG. 2 as window indicators 165a-d). The window indicators 165 may include another LED, or other type of display, that may illuminate in response to a user action. In one example, while the respective window 125 is being actively controlled, the window indicator 165 may be illuminated. For example, the second window indicator 165 may be illuminated in response to the front left window 125a being pushed upwards. Thus, during operation, the user may easily realize which windows are currently in motion (e.g., moving up or down).

Figure 3:
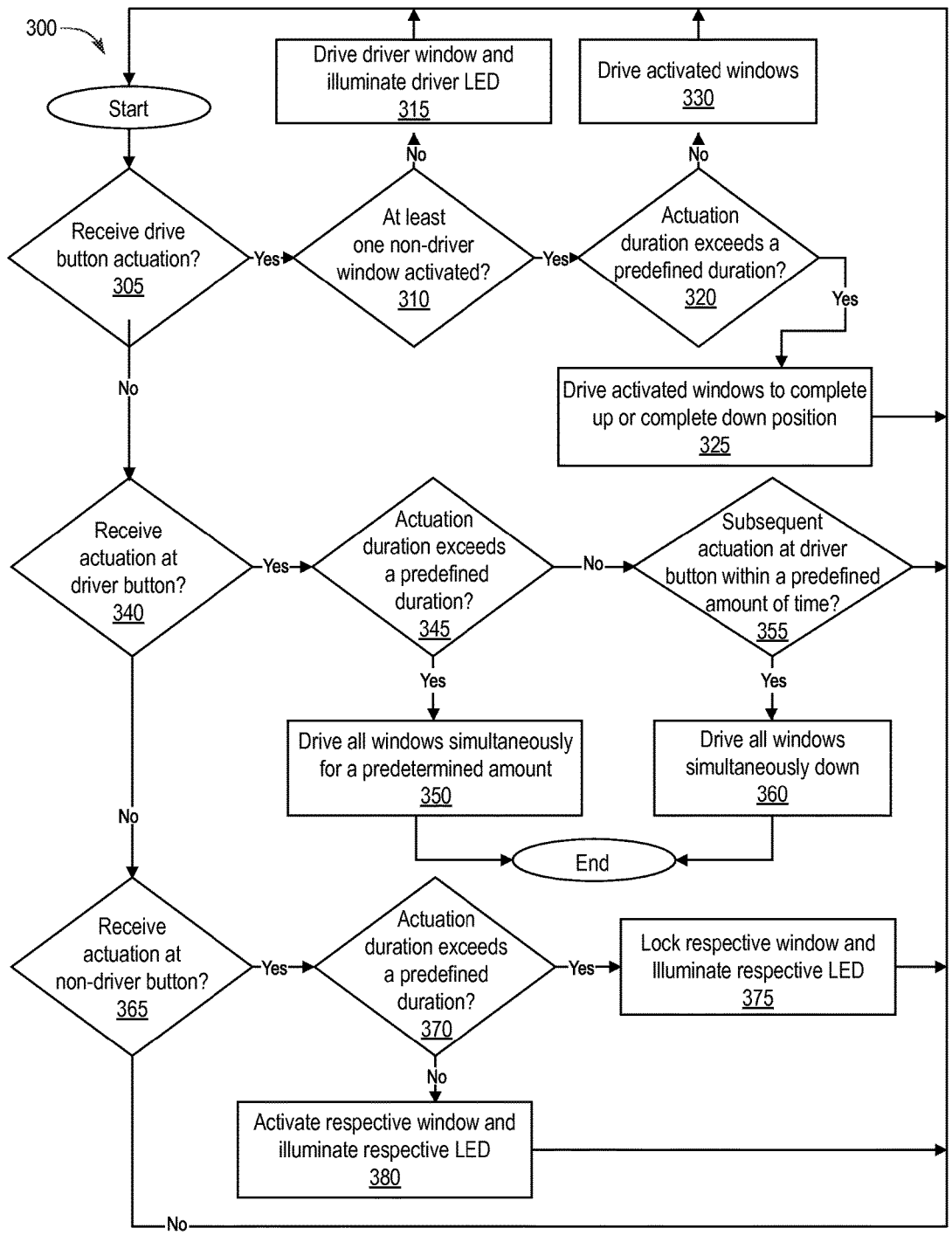
FIG. 3 illustrates a window control process for the window control system.

FIG. 3 illustrates a process 300 for controlling the various windows 125. In general the drive button 140 may control one or more of the windows 125. In default, the driver window 125a is controlled by the drive button 140. That is, if no other windows 125 are selected, than actuations at the drive button 140 will control only the driver window (e.g., front left window 125a.) Selecting other windows 125 by depressing the respective selector buttons 150 may dictate which of the windows 125 are controlled by the drive button 140. For example, if selector buttons 150a and 150b are depressed, then pushing downwards at the drive button 140 may cause both the front windows 125a, 125b to be lowered simultaneously. Other user interactions may also determine how the windows 125 are controlled. For example, if the drive button is pushed upwards or downwards for a predetermined amount of time (e.g., 0.8 seconds, 1.5 seconds, etc.), than the selected windows 125 may be completely opened or closed without further actuation. This is also known as "express" complete up/down.

Other interactions at the selector buttons 150 may also determine how the windows 125 are controlled. For example, if the first selector button 150a is held down for a predefined duration, then all windows 125 may be driven down to a predetermined amount (e.g., three inches), typically for "venting" the vehicle. If the first selector button 150a is depressed simultaneously three times, then all of the windows 125 may be automatically selected and eventually controlled by the drive button 140. If a non-driver window selector button 125b-d is held down for a predefined amount of time, the respective window 125 may be locked. Thus, a user friendly system for controlling vehicle windows 125 may be realized.

The process 300 begins at block 305 where the window control module 105 determines whether actuation at the drive button 140 was recognized. If so, the process 300 proceeds to block 310. If not, the process 300 proceeds to block 340.

At block 310, the module 105 determines whether at least one non-driver window is selected (e.g., windows 125b-d). If not, the process 300 proceeds to block 315 where the drive button 140 exclusively controls the driver window (e.g., front left window 125a). The status indicator 160a may also be illuminated.

At block 320, the module 105 determines whether the actuation at the drive button 140 exceeds a predefined duration, for example 1.0 seconds. If so, the process 300 proceeds to block 325 where each of the selected/activated windows 125 are completely opened or completely closed, depending on the drive direction at the drive button 140.

At block 330, the window control module 105 controls the selected windows 125 based on the actuation at the drive button (e.g., drives the windows 125 up or down).

At block 340, the window control module 105 determines whether actuation at the first selector button 150a is recognized. That is, is the first selector button 150a depressed. If so, the process 300 proceeds to block 345. If not, the process 300 proceeds to 365.

At block 345, the window control module 105 determines whether the actuation at the first selector button 150a exceeds a predefined duration (e.g., 0.8 seconds). If so, the process 300 proceeds to block 350 where all of the windows 125, regardless of whether they have been previously selected, are lowered a predefined distance. For example, each window 125 may be lowered three inches to provide for "venting" of the vehicle.

If the window control module 105 determines that the actuation at the first selector button 150a does not exceed the predefined duration at block 345, the process 300 proceeds to block 355 where the window control module 105 determines whether a subsequent actuation at the drive button 140 was recognized within a predefined amount of time of the first recognized actuation at block 340. That is, the window control module 105 determines if the first selector button 150a depressed multiple times within a short amount of time (e.g., within one second). In one example, the button 150a may be depressed three times. If multiple depressions are recognized at the first selector button 150a, the process 300 proceeds to block 360. If not, the process 300 proceeds to block 305.

At block 360, the window control module 105 instructs all windows 125 to lower completely, regardless of whether they have been previously selected.

At block 365, the window control module 105 may determine whether actuation was recognized at a non-driver selector button 150b-d. If so, the process 300 proceeds to block 370. If not the process proceeds to block 305.

At block 370, the window control module 105 may determine whether the actuation, or depression, of the non-driver window selector button 150b-d exceeds a predefined amount of time (e.g., 0.8 seconds, 1.5 seconds, etc.). If so, the process 300 proceeds to block 375 where the window control module 105 locks the window 125 associated with the depressed selector button 150 and illuminates the respective status indicator 160 thereof. In this example, the status indicator 160 may be red to indicate a locked status. By locking the selected window 125, other window controls at that window 125 may be rendered inactive. That is, only the driver may control the locked window 125 at the window switch 120. This may be advantageous with child passengers.

At block 380, if the actuation of the non-driver window selector button 150b-d does not exceed the predefined amount of time, the window control module 105 may activate the window and illuminate the respective status indicator 160 accordingly. In this example, the status indicator 160 may be green to indicate an active or selected status.

FIG. 3 is intended to be exemplary. Other options for controlling the windows 125 may also be realized. In another example, depressing and holding down the third and fourth selector buttons 150c, 150d for a predefined amount of time may instruct the window control module 105 to lock all the windows 125, regardless of whether they were previously selected or locked. The status indicators 160 for all windows 125 would then turn to red. In some examples, the driver window (e.g., front left window 125a) may never become locked. This may increase the safety of all passengers. For example, the driver may have control over all of the windows 125, including his or her own, but child passengers may not.

In another example, depressing and holding down the first and second selector buttons 150a, 150b for a predefined amount of time may instruct the module 105 that all of the windows are to be lowered. The window indicators 165 for each window may thus be illuminated during this action.

In the examples above, where a certain input from a user may instruct fully closing or fully opening one or more window 125 (e.g., block 325), the drive button 140 may remain in the respective position until the action has been completed. That is, while a user may only need to push the drive button 140 upward for approximately one second, it may take longer than that for the windows 125 to fully close. During the closing of the windows 125, the drive button 140 may remain in a pushed forward position, even after the user has ceased interaction with it. Upon completion of closing the windows 125, the drive button 140 may return to a neutral position. The same may be true for opening the windows 125. This allows for the user to "feel" the operation position.

Figure 4:
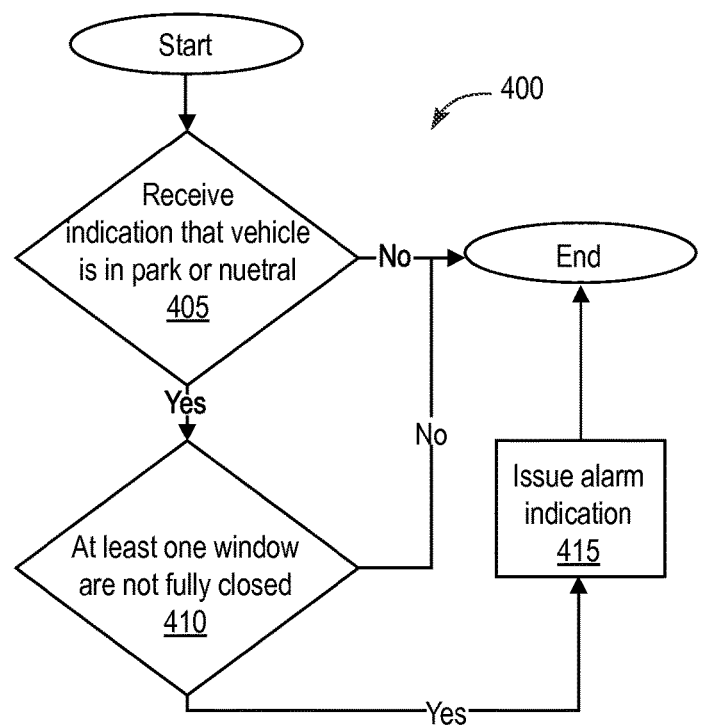
FIG. 4 illustrates a warning process for the window control system.

FIG. 4 illustrates a process 400 for warning the user of potential problems with respect to the windows 125. The process 400 may begin at block 405 where the window control module 105 may receive information (e.g., vehicle status information and window status information) from the vehicle control module 110 and determine from the information whether the vehicle is in one of park and neutral. If the vehicle is in park or neutral, the process 400 proceeds to block 410. If the vehicle is in drive or reverse, or any other state other than park or neutral, the process 400 ends.

At block 410, the window control module 105 may determine whether at least one of the windows 125 is not fully closed. This determination may be made at least in part based on the information received from the vehicle control module 110, which may indicate whether a window 125 is open or closed. If at least one window 125 is not fully closed, the process 400 may proceeds to block 415. If not, the process 400 ends.

At block 415, the window control module 105 may instruct the status indicators 160 of the un-closed windows to illuminate. This may include instructing the status indicators 160 to blink red so as to draw the attention of the user. Additionally or alternatively, the window control module 105 may instruct the window indicators 165 to also flash. In one example, all of the indicators 160, 165 may be illuminated and flashing. In another example, only the indicator 160, 165 corresponding to the unclosed window 125 may flash.

Accordingly, a user-friendly window operating system and switch is disclosed herein. The described system allows a driver to easily control the various windows within the vehicle without the need for separate actuating controls for each window. It prevents the driver from depressing multiple buttons when desiring to drive more than one window up or down because a single actuation may control multiple windows. The system further warns the driver of open windows to prevent theft, or damage from precipitation and other elements.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a plurality of windows;
   a switch including a plurality of window selector buttons each corresponding to one of the windows and including an indicator; and
   a controller configured to,
      in response to actuation of the switch exceeding a predefined amount of time, open each of the windows a predefined distance, and
      in response to the vehicle being in park or neutral clutch positions, illuminate the indicators.

2. The vehicle of claim 1, wherein the controller is further configured to open each of the windows at a same time.

3. The vehicle of claim 1, wherein the predefined distance is less than a height of the windows.

4. The vehicle of claim 1, wherein the predefined amount of time is approximately 0.8 seconds.

5. The vehicle of claim 1, wherein the switch includes a single drive button for receiving input to move one or more of the windows according to statuses of the selector buttons.

6. The vehicle of claim 5, wherein the drive button includes a guide portion configured to receive a finger of a user.

7. A vehicle comprising:
   a plurality of windows;
   a switch including a plurality of window selector buttons each corresponding to one of the windows;
   a single drive button for receiving input to two or more of the windows according to statuses of the selector buttons; and,
   a controller configured to:
   in response to actuation of the switch exceeding a predefined amount of time, concurrently open each of the windows a predefined distance, wherein each of the window selector buttons includes an indicator,
   update the indicator of the window selector button corresponding to the one of the windows in response to the one of the windows being locked; and
   in response to the vehicle being in park or neutral, to illuminate the indicators.

8. The vehicle of claim 7, wherein the drive button includes a guide portion configured to receive a finger of a user.

9. The vehicle of claim 7, wherein the controller is further configured to cause the indicators, when illuminated, to blink.

* * * * *